(12) United States Patent  (10) Patent No.: US 7,725,627 B2
Crain, II et al.  (45) Date of Patent: May 25, 2010

(54) SERIAL PORT THAT SUPPORTS MULTIPLE PROTOCOLS

(75) Inventors: Charles E. Crain, II, Austin, TX (US); Tony Widjaja, Austin, TX (US)

(73) Assignee: National Instruments Corporation, Austin, TX (US)

( * ) Notice: Subject to any disclaimer, the term of this patent is extended or adjusted under 35 U.S.C. 154(b) by 484 days.

(21) Appl. No.: 11/560,071

(22) Filed: Nov. 15, 2006

(65) Prior Publication Data

US 2007/0168590 A1  Jul. 19, 2007

Related U.S. Application Data

(60) Provisional application No. 60/752,791, filed on Dec. 21, 2005.

(51) Int. Cl.
*G06F 13/12* (2006.01)
(52) U.S. Cl. ...................................................... 710/71
(58) Field of Classification Search ...................... None
See application file for complete search history.

(56) References Cited

U.S. PATENT DOCUMENTS

| | | | |
|---|---|---|---|
| 4,979,169 | A | 12/1990 | Almond et al. |
| 5,841,992 | A | 11/1998 | Martin |
| 6,505,267 | B2 | 1/2003 | Luke et al. |
| 6,535,522 | B1 | 3/2003 | Arato et al. |
| 6,847,349 | B2 | 1/2005 | Azinger |
| 6,865,235 | B2 | 3/2005 | Khoini-Poorfard |
| 7,035,247 | B2 * | 4/2006 | Ofek et al. ................... 370/350 |
| 7,065,101 | B2 | 6/2006 | Ziegler et al. |
| 7,088,680 | B1 | 8/2006 | Freitag, Jr. et al. |
| 7,430,196 | B2 * | 9/2008 | Turunen ..................... 370/342 |
| 7,508,190 | B2 * | 3/2009 | Kagan et al. ................. 324/142 |
| 2002/0018475 | A1 * | 2/2002 | Ofek et al. ................... 370/400 |

(Continued)

OTHER PUBLICATIONS

"ENET -232 Series and ENET -485 Series User Manual for Windows 2000/NT 4.0 and Linux x86/Solaris 2.x"; Nov. 2001 Edition; 105 pages; National Instruments Corporation.

(Continued)

*Primary Examiner*—Tariq Hafiz
*Assistant Examiner*—Aurangzeb Hassan
(74) *Attorney, Agent, or Firm*—Meyertons Hood Kivlin Kowert & Goetzel, P.C.; Jeffrey C. Hood; Joel L. Stevens (57) ABSTRACT

System and method for performing distributed input/output (I/O). A distributed I/O device (the device) coupled to a controller may read data from a serial port, may determine if the data are framed by time, and if so, may handle the data according to a time-based protocol. If the data are not framed by time, the device may determine if the data are framed by delimiters, and if so, may determine an appropriate delimiter-based protocol for the data from a plurality of delimiter-based protocols, and handle the data according to the appropriate delimiter-based protocol. This process may be repeated in an iterative manner to read a stream of data from the serial port. The device may include or be coupled to one or more I/O modules (e.g., for DAQ, motion control, etc.), which themselves may be coupled to a unit under test or other external device or phenomenon via additional devices.

20 Claims, 7 Drawing Sheets

U.S. PATENT DOCUMENTS

| | | | |
|---|---|---|---|
| 2003/0174070 A1* | 9/2003 | Garrod et al. | 340/870.07 |
| 2004/0138786 A1* | 7/2004 | Blackett et al. | 700/295 |
| 2004/0177153 A1* | 9/2004 | Pelley | 709/236 |
| 2005/0089054 A1* | 4/2005 | Ciancaglini et al. | 370/412 |
| 2005/0094640 A1* | 5/2005 | Howe | 370/395.1 |

OTHER PUBLICATIONS

"NI Serial Hardware Specifications Guide"; Aug. 2005; 28 pages; National Instruments Corporation.

"NI ENET -232/4 4-Port Ethernet Interface for RS232", Datahseet; Aug. 2005; 5 pages; Retrieved from the Internet: http://www.ni.com/pdf/products/us/4gpib716_677-680.pdf.

Lynn Linse; "The Agnostic View of Serial Bridging Protocols"; The Industrial Ethernet—Technical Article; Dec. 2005; Issue 26:36; GGH Marketing Communications Limited.

* cited by examiner

SERIAL PORT THAT SUPPORTS MULTIPLE PROTOCOLS

PRIORITY

This application claims benefit of priority of U.S. provisional application Ser. No. 60/752,791 titled "Serial Port that Supports Multiple Protocols" filed Dec. 21, 2005, whose inventors were Charles E. Crain II and Tony Widjaja.

FIELD OF THE INVENTION

The present invention relates to the field of serial communications, and more particularly to a system and method for serial communications supporting multiple protocols.

DESCRIPTION OF THE RELATED ART

A distributed I/O device performs measurements and generates signals based on data, e.g., commands, transmitted from a host device, typically a computer or controller. The distributed I/O device is generally coupled to one or more modules that acquire data or generate signals, based on the commands received from the controller, and, in the case of data acquisition (DAQ), may transmit the acquired data to the host controller, or to another external device.

Many applications involve measurements or devices to control in environments for which it is physically inconvenient or impossible to deploy a system based on personal computers (PCs) or consumer-level electronics. In these situations, distributed I/O devices are often used, because they are typically rated very highly for resistance to extreme temperatures, shock/vibration, electromagnetic interference, static discharge, etc., much more so than PCs or consumer-level electronics. Some typical applications for distributed I/O devices are:

factory automation—the devices are deployed around a factory and used to monitor and control devices associated with a manufacturing process. For example, they may drive a conveyor belt, or monitor the temperature in a boiler and control the heater attached to it.

machine control—related to factory automation, but on a smaller scale, the device is deployed on a machine and used to control operations of the machine, e.g., large washers that wash silicon wafers prior to etching into semiconductor chips, trucks that service oil wells, and so forth.

product testing—the devices are often used to control and monitor large-scale product testing rigs.

data logging—the computer or controller connected to the device typically continuously requests data and logs the data to disk or a similar medium for later retrieval and analysis.

A controller may be thought of as a computer with the same rugged form as a distributed I/O device, i.e., a rugged distributed device that also includes programmability and intelligence. For example, National Instruments controllers, sometime referred to as "programmable automation controllers" (PACs) allow users to write LabVIEW (e.g., graphical) programs, then download them to the controllers, which then run them autonomously. Distributed I/O devices provide controllers an affordable way (distributed I/O devices cost less than controllers) to extend the amount of I/O that a controller can perform or manage, and also "distribute" that I/O to where it needs to be physically. Of course, a standard PC or workstation (or laptop) may also be used as a controller, environmental conditions permitting.

The data communicated between the controller and the distributed I/O device are transmitted over a variety of media using a variety of protocols, many of which are open standards. A common medium for data transmission used by these devices is serial, e.g., using RS-232, RS-422, or RS-485 interfaces. These media transmit data in streams, in which individual bits of data are sent in sequence. This is in contrast to a medium such as Ethernet, which sends data in packets, which are large (i.e., multi-bit or multi-byte) sets of data with a defined beginning and ending. Transmitting distributed I/O data over a stream-based medium has a central challenge: distributed I/O protocols are message based (i.e., consisting of discrete, large data sets) and are therefore better suited for packet-based media. Therefore, any distributed I/O protocol that travels over a stream-based medium must have some type of framing convention, which is an aspect of the protocol that defines where a message begins and ends. The distributed I/O protocol often includes a consistency check, such as a checksum or cyclic redundancy check (CRC), that ensures integrity of the message.

Serial media such as RS-232 do not have standard framing conventions, and therefore each individual distributed I/O protocol is free to define its own. In general, framing conventions fall into two categories:

1) Time-based: the beginning and end of messages are defined by pauses between messages. For example, a specification for a time-based framing convention might indicate that the end of a message occurs after a pause of greater than 100 milliseconds, or, as another example, greater than 64 bit times, where a bit time is the time required for the medium to transmit one bit of data. An example of a protocol with time-based framing is Modbus RTU.

2) Delimiter-based: the beginning and end of messages is indicated by some special sequence of bits that is guaranteed never to occur in the middle or body of a valid message. Valid data reside between the beginning and end sequences, and any other data are disregarded. Examples of delimiter-based protocols are Modbus ASCII and OptoMUX.

Currently, distributed I/O devices generally support only a single protocol with a single framing convention. Thus, customers must order the specific device that supports the protocol they wish to employ. Some more sophisticated devices allow the user to configure the device to accept a variety of protocols that the device supports. However, no currently available devices allow the user to employ any of a variety of protocols with different framing conventions without first having to configuring the device to accept the specific protocol desired.

Thus, improved systems and methods for serial communications are desired.

SUMMARY OF THE INVENTION

One embodiment of a method for performing distributed I/O via any of a plurality of protocols without configuration. The method may operate as follows.

Data may be received, i.e., read, from a serial port, e.g., an RS-232 port, although it should be noted that any other type of serial port may be used as desired, e.g., RS-422, RS-485, etc.

A determination may be made as to whether the data are framed by time, and if so, then the data may be handled according to a time-based protocol. In some embodiments, the time-based protocol may be determined automatically, i.e., without user input specifying the time-based protocol. Thus, the time-based protocol may be determined based on the received data, e.g., in order to allow for a "plug and play"

framework for the distributed system. Thus, in some embodiments, the controller may dynamically determine and use various protocols without specific user configuration.

If the data are determined to not be framed by time, a determination may be made as to whether the data are framed by delimiters.

If the data are determined to be framed by delimiters, an appropriate delimiter-based protocol for the data from a plurality of delimiter-based protocols may be determined, and the data may be handled according to the appropriate delimiter-based protocol. Similar to above, the determination of the delimiter-based protocol may be performed automatically (without user input selecting the delimiter-based protocol). The protocol may be selected based on the received data, e.g., allowing for the plug and play interface described above. Thus, in some embodiments, the controller may dynamically determine and use various protocols without specific user configuration.

Finally, as indicated, the method may be repeated in an iterative manner to read a stream of data from the serial port.

Note that the data may be read by a distributed I/O device (that includes the serial port) coupled to a controller via a serial transmission medium. In various embodiments, the serial transmission medium may be a synchronous or asynchronous serial transmission medium. The distributed I/O device may also be coupled to one or more devices that may themselves be coupled to additional devices. One or more of the I/O modules may be comprised in the distributed I/O device, i.e., may be inserted into slots in the distributed I/O device, or alternatively, may comprise external devices coupled to the distributed I/O device via any of various transmission media. In one embodiment, one or more of the I/O modules may be operable to perform measurement or control operations, e.g., signal generation, data acquisition, motion control, etc.

The data read from the serial port may include commands sent from the controller, e.g., specifying one or more operations to be performed with or by the devices coupled to the distributed I/O device. For example, a first I/O module may include a signal generator that may be operable to provide a stimulus signal to a unit under test (UUT). A second I/O module may include a DAQ device that may be operable to receive resultant signals from the UUT in response to the provided stimulus signal. The controller may thus send a command to the distributed I/O device invoking the generation of the stimulus signal (via the first I/O module), and may also send a command specifying that the second module acquire the resulting signals and send them to the controller (or another device) for storage and/or analysis. Thus, the distributed I/O device may communicate with, e.g., may send and receive data to and from, the controller, e.g., in accordance with the determined communication protocol. Note that in some embodiments, a command may be assembled from data received over multiple read cycles.

Note that in some embodiments, the method may only support a single time-based protocol, or multiple time-based protocols if and only if their inter-message timeouts or durations are identical. Note also that the methods described herein may support an arbitrary number of delimiter-based protocols, since the delimiter-based handler may be capable of searching for multiple sets of begin/end sequences simultaneously.

Furthermore, an assumption may be made that any protocols supported have some type of integrity check that indicates whether a message is valid or not, such as a CRC check or checksum, or any other integrity check desired. Thus, the method may include performing integrity checks and verifying those checks.

Thus, various embodiments of the above method may operate to dynamically read serial data streamed from a serial port in accordance with any of a variety of communication protocols without requiring configuration, e.g., user configuration, of the system.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

Provisional Application Ser. No. 60/752,791, entitled "Serial Port that Supports Multiple Protocols", whose inventors were Charles E. Crain II and Tony Widjaja is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 1A:
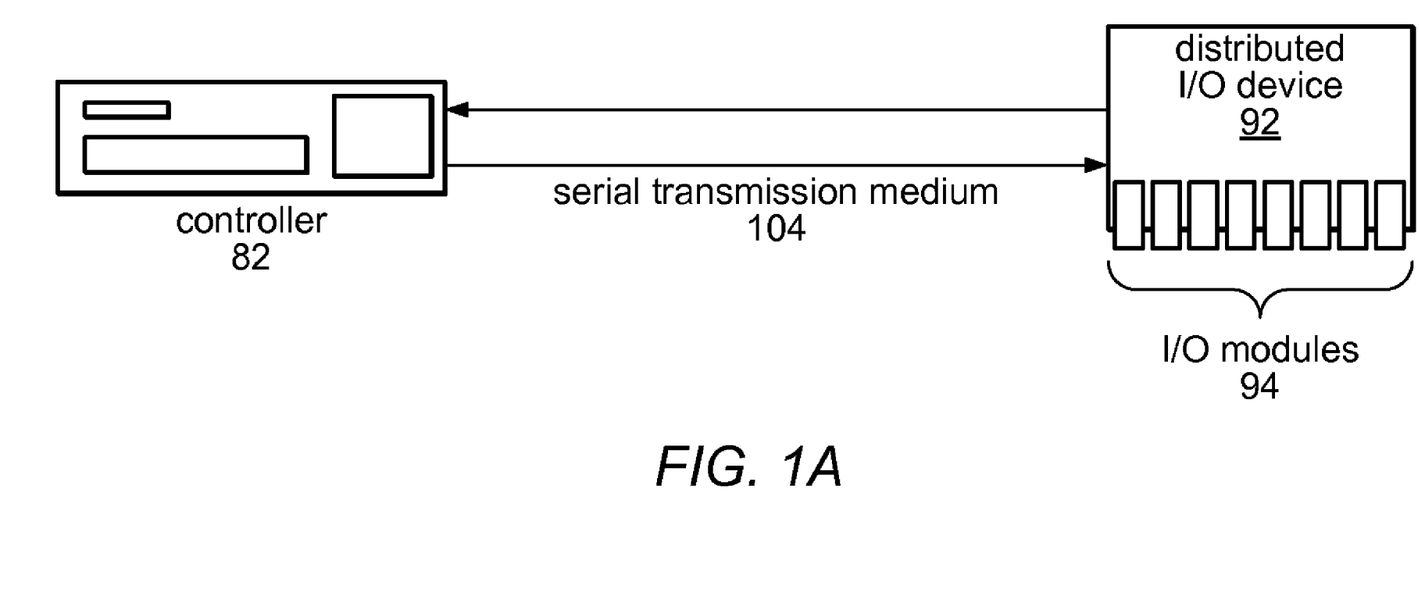
FIGS. 1A and 1B illustrate distributed I/O systems suitable for implementing various embodiments of the present invention.
Figure 1B:
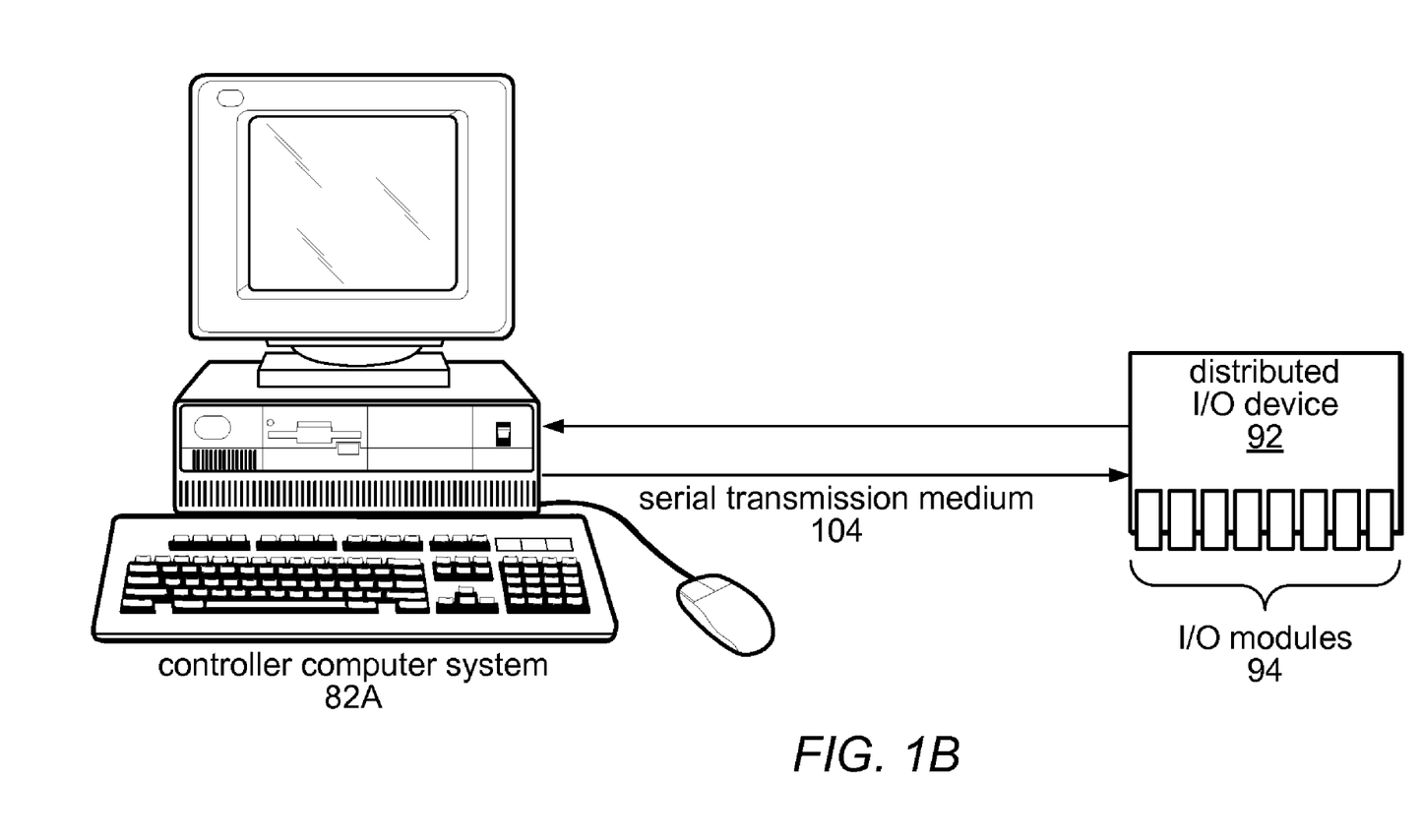

FIGS. 1A and 1B—Distributed I/O Systems

FIGS. 1A and 1B illustrate distributed I/O systems suitable for implementing various embodiments of the present invention.

As may be seen, FIG. 1A illustrates a distributed I/O system that includes a controller 82, which may be referred to as a dedicated controller, coupled to a distributed I/O device 92 via a serial transmission medium 104. In this embodiment, the distributed I/O device 92 includes a plurality of I/O modules 94, e.g., for data acquisition, control, automation, signal generation, and so forth, as desired, which may in turn be coupled to external devices, e.g., units under test (UUT), motion control or automation devices, etc. In other embodiments, the I/O functionality (of one or more of the modules) may be provided by one or more external devices coupled to the distributed I/O device.

Note that, as is well known in the art, the controller includes some type of processor and memory, but may have limited, or no, stand alone user interface capabilities, i.e., generally does not include a display device, and so may rely on a host computer system for user input, e.g., configuration, programming, etc.

FIG. 1B illustrates a distributed I/O system that uses a desktop computer or workstation as a controller, specifically, controller computer system 82A, where the controller computer system is coupled to the distributed I/O device 92 via the serial transmission medium 104.

The controller computer system 82A (or controller 82 of FIG. 1A) may operate to execute a program, e.g., a text based or graphical program, e.g., application, which may communicate with the distributed I/O device 92 to perform specified functionality, e.g., a measurement, control, or automation function, among others.

Note that as used herein, the term "controller" may be used generally to refer to either type of controller, i.e., PC/workstation based (FIG. 1B), or compact (FIG. 1A).

The controller may include a memory medium(s) on which one or more computer programs or software components according to one embodiment of the present invention may be stored. For example, the memory medium may store one or more text based programs (e.g., C/C++, JAVA, etc.) and/or graphical programs (e.g., LabVIEW graphical programs, IEC-61131 ladder logic or function block diagrams, etc.) that are executable to perform the methods described herein. Also, in the controller computer system embodiments, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Further details of the operation of the distributed I/O device are provided below.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general-purpose software applications such as network control, network monitoring, financial applications, games, etc.

Figure 2A:
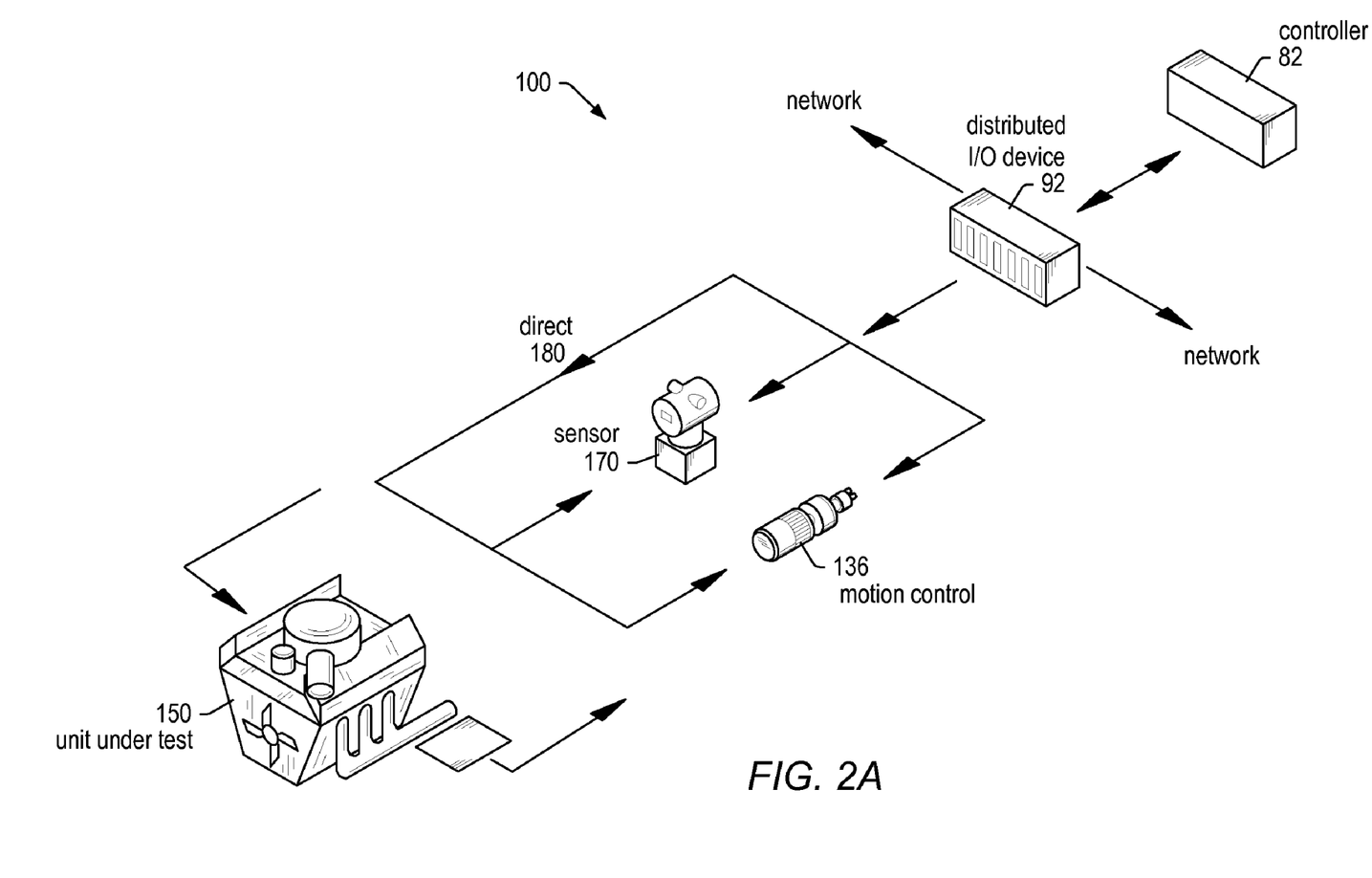
FIG. 2A illustrates an instrumentation control system according to one embodiment of the invention.

FIG. 2A illustrates an exemplary instrumentation control system 100 which may implement embodiments of the invention. The system 100 comprises a controller 82 which connects to one or more devices via the distributed I/O device 92. As noted above, the controller 82 may comprise a CPU and memory. The controller 82 may operate with the one or more devices through the distributed I/O device 92 to analyze, measure, and/or control a unit under test (UUT) or process 150.

The one or more devices may include a motion control device 136, and/or a sensor (e.g., transducer) 170, among other types of devices. The controller 82 may couple to and operate with one or more of these devices via the distributed I/O device 92, which may include various instruments, e.g., DAQ devices, interface cards (e.g., for motion control), etc., in the form of I/O modules 94. The devices may in turn be coupled to a unit under test (UUT) or process 150. As also shown, the distributed I/O device may also be operable to receive signals directly from the UUT or process 150 via a direct channel 180. The system 100 may be used in a data acquisition and control application, in a test and measurement application, a machine vision application, a process control application, a man-machine interface application, a simulation application, or a hardware-in-the-loop validation application, among others.

Figure 2B:
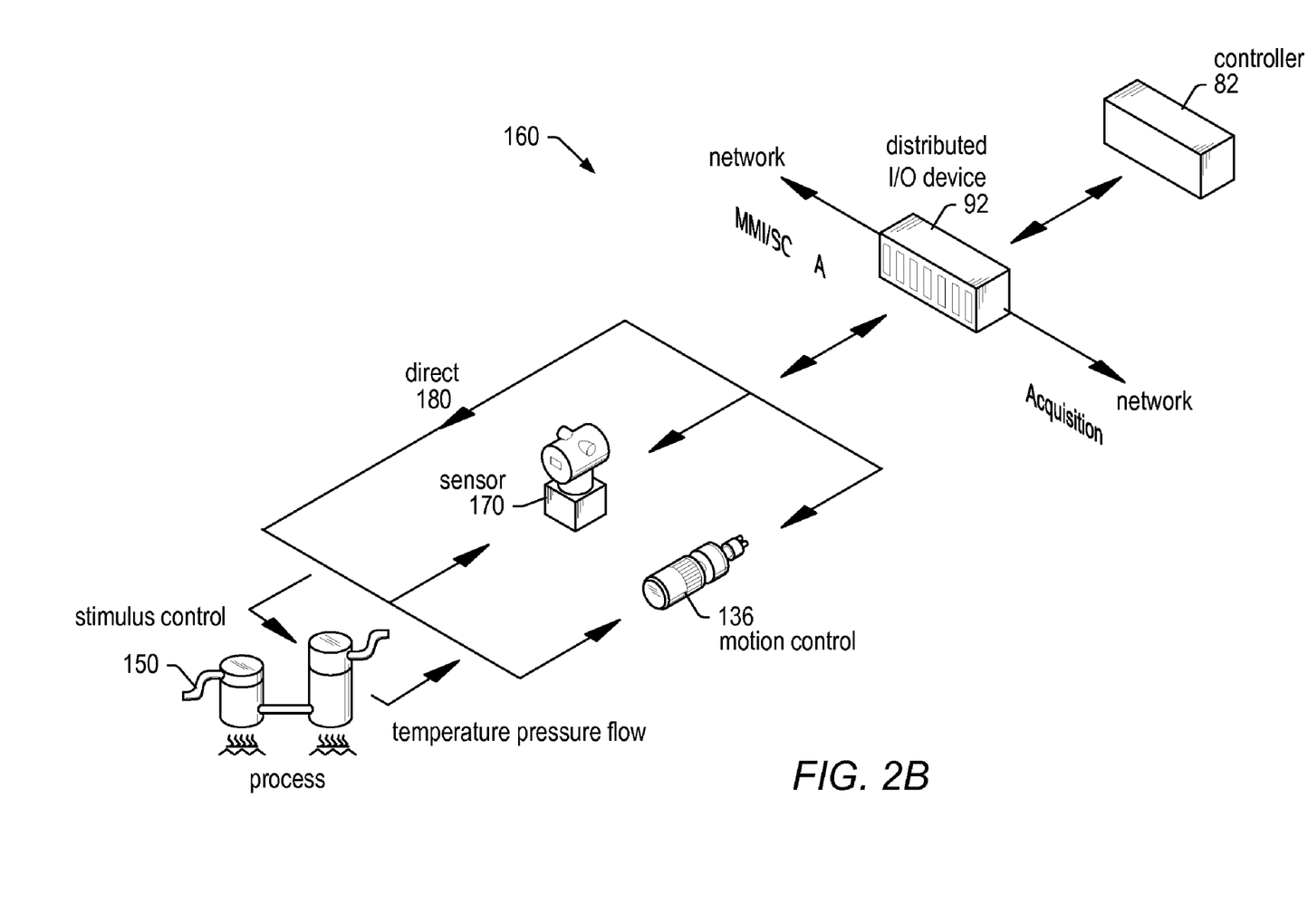
FIG. 2B illustrates an industrial automation system according to one embodiment of the invention.

FIG. 2B illustrates an exemplary industrial automation system 160 that may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a controller 82 that connects to one or more devices via the distributed I/O device 92. As noted above, the controller 82 may comprise a CPU and memory, and may operate via the distributed I/O device 92 with the one or more devices coupled to process or device 150 to perform an automation function, such as MMI (Man Machine Interface), SCADA (Supervisory Control and Data Acquisition), portable or distributed data acquisition, process control, advanced analysis, and/or other control, among others.

The one or more devices may include a motion control device 136, and/or a sensor (e.g., transducer) 170, among other types of devices. The controller 82 may couple to and operate with one or more of these devices via the distributed I/O device 92, which may include various instruments, e.g., DAQ devices, interface cards (e.g., for motion control), etc., in the form of I/O modules 94. The devices may in turn be coupled to a unit under test (UUT) or process 150. As also shown, the distributed I/O device may also be operable to receive signals directly from the UUT or process 150 via a direct channel 180. The system 100 may be used in a data acquisition and control application, in a test and measurement application, a machine vision application, a process control application, a man-machine interface application, a simulation application, and/or a hardware-in-the-loop validation application, among others.

Figure 3A:
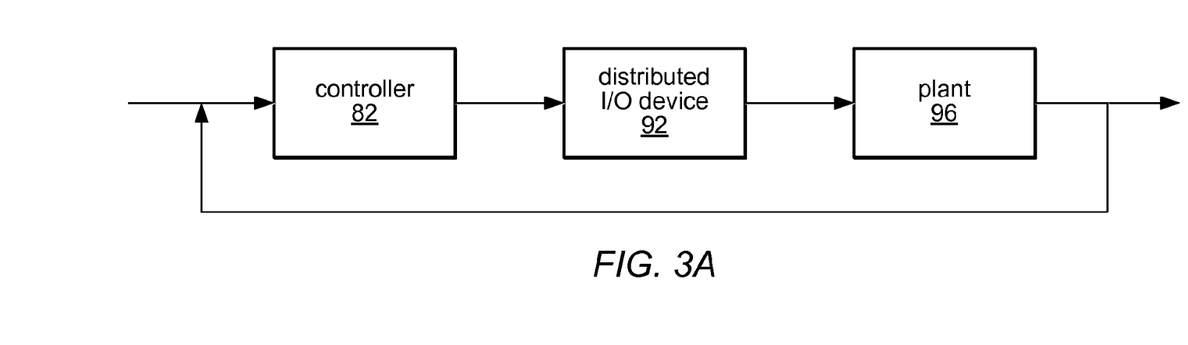
FIG. 3A is a high level block diagram of an exemplary system which may execute or utilize programs according to some embodiments.

FIG. 3A is a high-level block diagram of an exemplary system that may execute or utilize programs according to the present invention. FIG. 3A illustrates a general high-level block diagram of a generic control and/or simulation system that comprises a controller 82, a distributed I/O device 92, and a plant 96. The controller 82 represents a control system/algorithm the user may be trying to develop. The distributed I/O device 92 represents the distributed I/O interface between the controller 82 and the plant 96. The plant 96 represents the system the user may be trying to control. For example, if the user is designing an electronic control unit (ECU) for a car, the controller 82 is the ECU and the plant 96 is the car's engine (and possibly other components such as transmission, brakes, and so on.) As shown, a user may create a program, e.g., a graphical program, that specifies or implements the functionality of one or all of the controller 92, the distributed I/O device 92, and the plant 96. For example, a control engineer may use a modeling and simulation tool to create a model (e.g., a graphical program) of the plant 96 and/or to implement the algorithm for the controller 92, and possibly for the distributed I/O device 92.

Figure 3B:
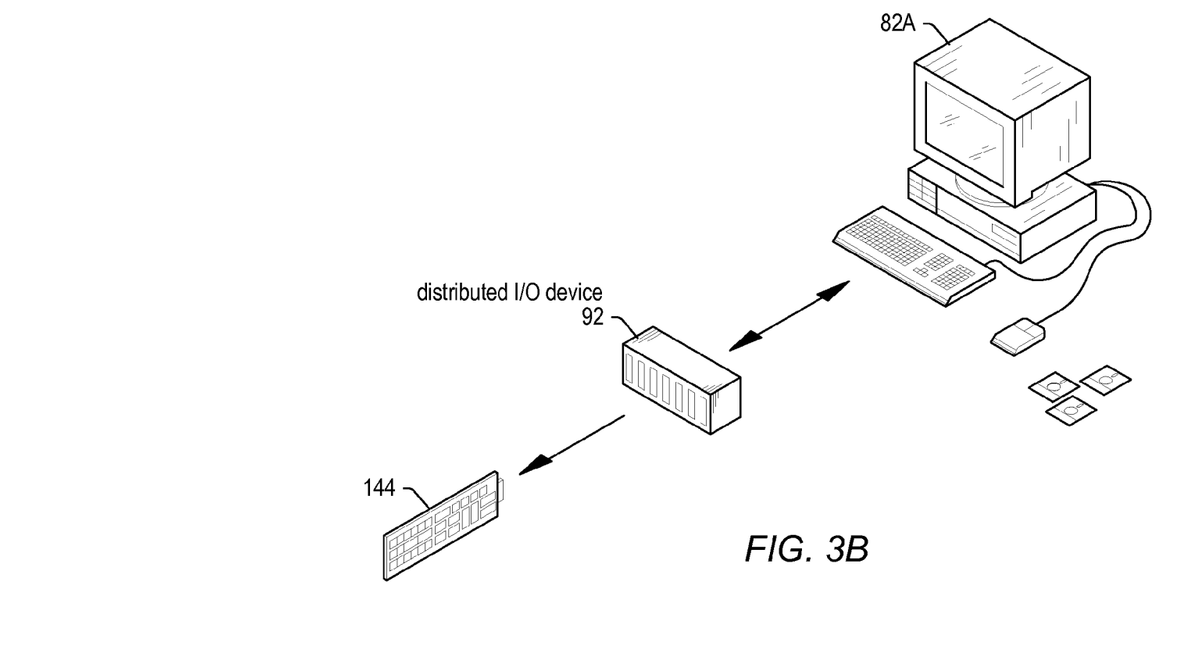
FIG. 3B illustrates an exemplary system which may perform control and/or simulation functions.

FIG. 3B illustrates an exemplary system that may perform control and/or simulation functions. As shown, the controller 82 may be implemented by a computer system 82A or other device (e.g., including a processor and memory medium and/or including a programmable hardware element) that executes or implements embodiments of the present invention. In a similar manner, the plant 96 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 82, e.g., on a computer system 82A or other device. The controller or computer system may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 96 in real time to test operation of a real controller 82. For example, once the controller 82 has been designed, it may be expensive and complicated to actually test the controller 82 thoroughly in a real plant, e.g., a real car. Thus, the plant model (implemented by a graphical program) may be executed in real time to make the real controller 82 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user may select a target device from a plurality of possible target devices for programming or configuration using a graphical program. Thus, the user may create a (e.g., graphical) program on a computer and use (execute) the program on that computer or deploy the program to a target device (for remote execution on the target device) that is remotely located from the computer and coupled to the computer through a network.

In some embodiments, the target device may include the controller 82, various portions of the distributed I/O device 92, and/or any other systems described herein, among others.

Graphical software programs which perform data acquisition, analysis, and/or presentation, e.g., for measurement, instrumentation control, industrial automation, modeling, and/or simulation, such as in the applications shown in FIGS. 2A and 2B, may be referred to as virtual instruments.

Figure 4:
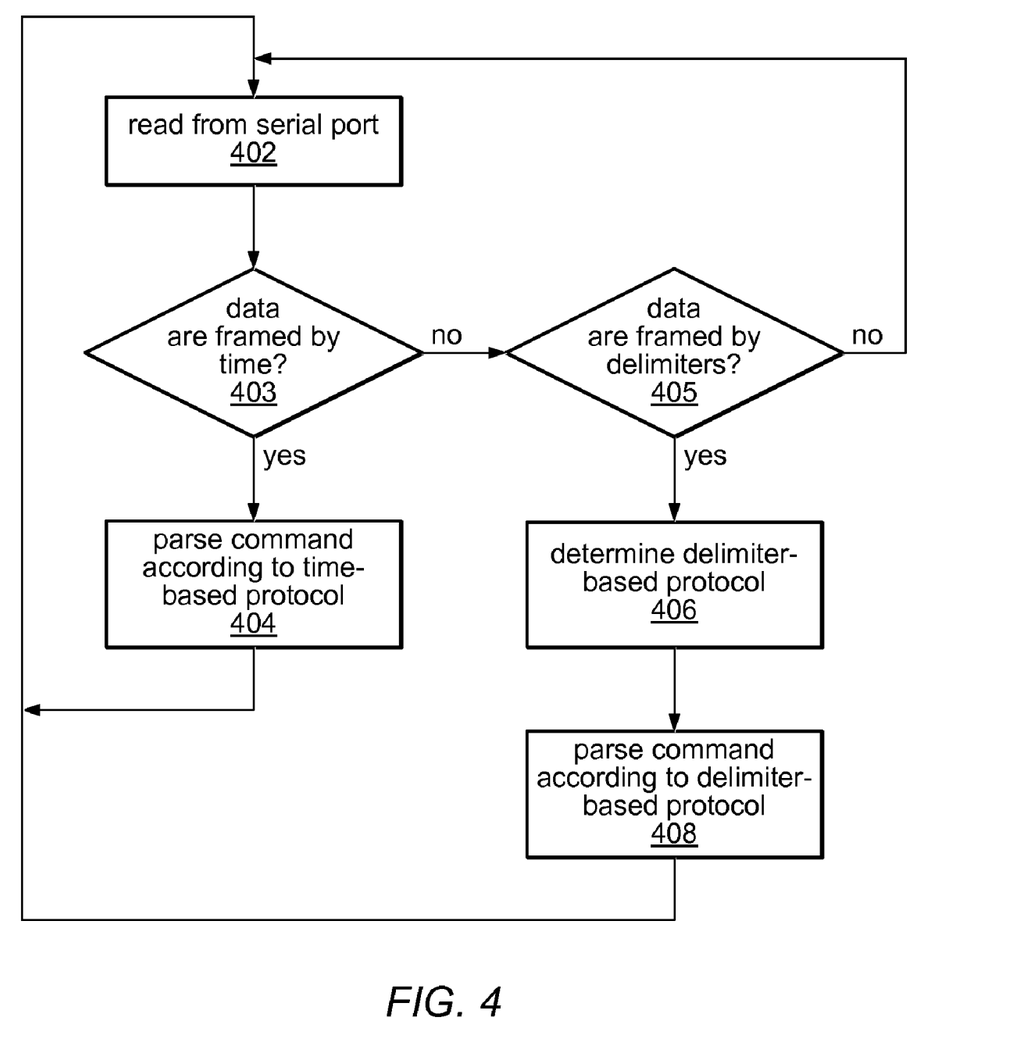
FIG. 4 is a flowchart diagram illustrating one embodiment of a method for performing distributed I/O.

FIG. 4—Method for Performing Distributed I/O

FIG. 4 illustrates one embodiment of a method for performing distributed I/O via any of a plurality of protocols without configuration. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, data may be received, i.e., read from a serial port, e.g., an RS-232 port, although it should be noted that any other type of serial port may be used as desired, e.g., RS-422, RS-485, etc.

In 403, a determination may be made as to whether the data are framed by time, and if so, then in 404, the data may be handled according to a time-based protocol. Note that the time-based protocol may be selected from a plurality of available time-based protocols, e.g., including a Modbus RTU protocol, among others. In some embodiments, the time-based protocol may be determined automatically, i.e., without user input specifying the time-based protocol. Thus, the time-based protocol may be determined based on the received data, e.g., in order to allow for a "plug and play" framework for the distributed system. Thus, in some embodiments, the controller may dynamically determine and use various protocols without specific user configuration.

If the data are determined to not be framed by time, then in 405, a determination may be made as to whether the data are framed by delimiters.

If the data are determined to be framed by delimiters, then in 406, an appropriate delimiter-based protocol for the data from a plurality of delimiter-based protocols may be determined, and in 408, the data may be handled according to the appropriate delimiter-based protocol. The plurality of delimiter-based protocols may include Modbus ASCII and/or OptoMUX, among others. Similar to above, the determination of the delimiter-based protocol may be performed automatically (without user input selecting the delimiter-based protocol). The protocol may be selected based on the received data, e.g., allowing for the plug and play interface described above. Thus, in some embodiments, the controller may dynamically determine and use various protocols without specific user configuration.

Finally, as indicated, the method elements 402-408 may be repeated in an iterative manner to read a stream of data from the serial port.

Note that in preferred embodiments, the data may be read by a distributed I/O device (that includes the serial port), e.g., the distributed I/O device 92, coupled to a controller, e.g., controller 82 or 82A, via a serial transmission medium. In various embodiments, the serial transmission medium may be a synchronous or asynchronous serial transmission medium. As described above, the distributed I/O device 92 may also be coupled to one or more devices, e.g., I/O modules 94 that may themselves be coupled to additional devices, as discussed above with reference to FIGS. 2A and 2B. As also described above, in some embodiments, one or more of the I/O modules may be comprised in the distributed I/O device, i.e., may be inserted into slots in the distributed I/O device, or alternatively, may comprise external devices coupled to the distributed I/O device via any of various transmission media. In one embodiment, one or more of the I/O modules may be operable to perform measurement or control operations, e.g., signal generation, data acquisition, motion control, etc.

The data read from the serial port may include commands sent from the controller, e.g., specifying one or more operations to be performed with or by the devices coupled to the distributed I/O device. For example, a first I/O module may include a signal generator that may be operable to provide a stimulus signal to a unit under test (UUT). A second I/O module may include a DAQ device that may be operable to receive resultant signals from the UUT in response to the provided stimulus signal. The controller may thus send a command to the distributed I/O device invoking the generation of the stimulus signal (via the first I/O module), and may also send a command specifying that the second module acquire the resulting signals and send them to the controller (or another device) for storage and/or analysis. Thus, the distributed I/O device may communicate with, e.g., may send and receive data to and from, the controller, e.g., in accordance with the determined communication protocol. Note that in some embodiments, a command may be assembled from data received over multiple read cycles.

Thus, various embodiments of the above method may operate to dynamically read serial data streamed from a serial port in accordance with any of a variety of communication protocols without requiring configuration of the system.

A more detailed embodiment of the method of FIG. 4 is described below with reference to FIG. 5.

Figure 5:
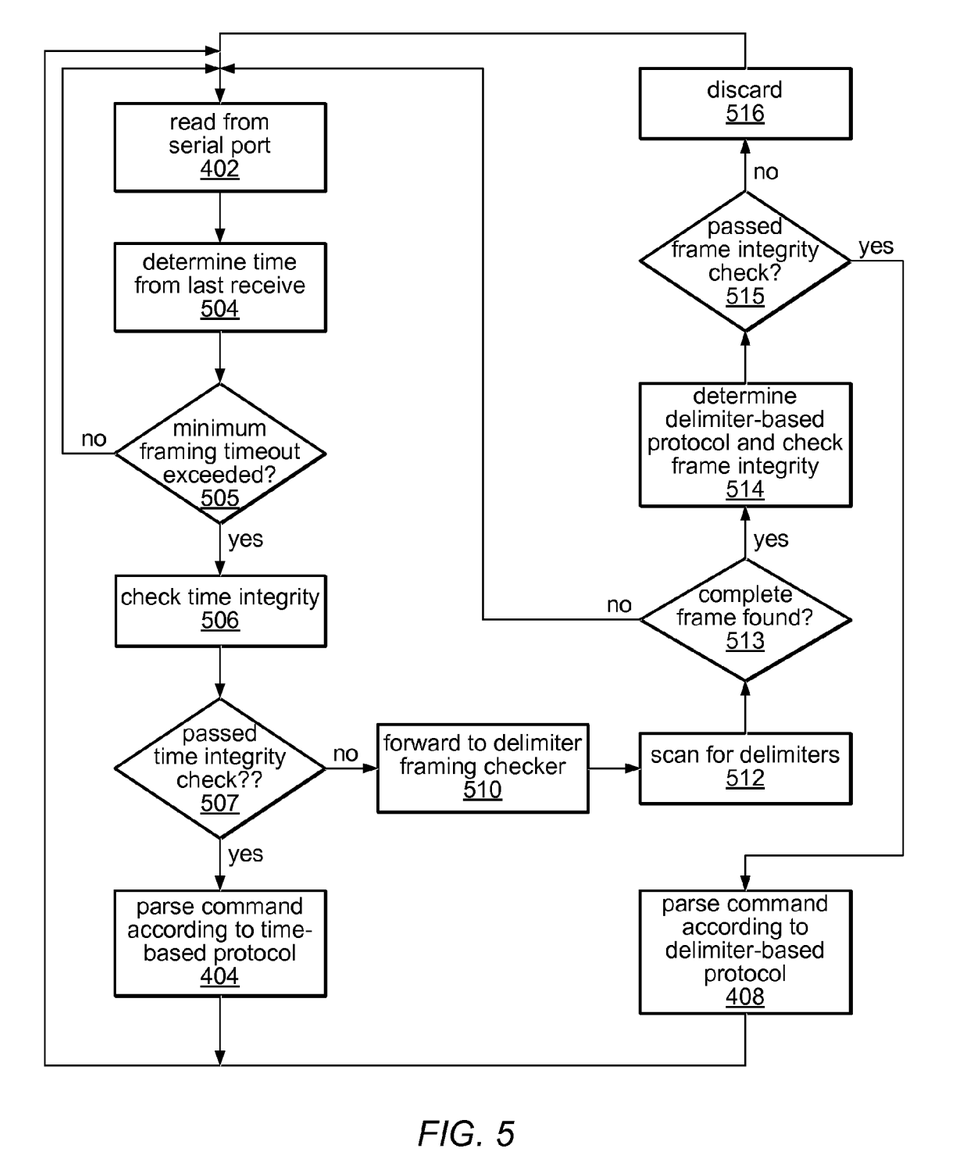
FIG. 5 is a flowchart diagram illustrating a more detailed embodiment of a method for performing distributed I/O.

FIG. 5—More Detailed Method for Performing Distributed I/O

FIG. 5 illustrates a more detailed embodiment of the method for performing distributed I/O described above with reference to FIG. 4. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows. Descriptions of method elements that are substantially the same as those of FIG. 4 are abbreviated.

First, as shown in FIG. 5, in 402, data may be read from a serial port, as described above with reference to FIG. 4.

In 504, the time elapsed from last receipt of data may be determined, and in 505, compared to a threshold value, e.g., a minimum time-based framing duration or timeout, to determine if the data may be framed by time. For example, the data reception of 402 may occur at a current time of reception, and a duration between reception of immediately previous received data and the current time of reception may be determined. This duration may then be checked against a known minimum timing frame duration of a time-based protocol (505). As mentioned above, if the determined duration is greater than the threshold value, then it is possible that the data may be formatted according to the time-based protocol.

In one embodiment, for example, a server process executing on the distributed I/O device, preferably a FieldPoint device, may constantly gather data from the RS-232 port, and measure the time between characters received.

If in 505, it is determined that the duration exceeds the specified value, an integrity check of the data may be performed in accordance with the time-based protocol, (i.e., a time integrity check) as indicated in 506. Any type of integrity check (consistent with the time-based protocol) may be used as desired, including but not limited to, cyclic redundancy check (CRC), checksum, and so forth. Note that in some embodiments, a particular time-based protocol may be determined from a plurality of possible time-based protocols, e.g., based on analysis of the received data and/or the determined duration.

Said another way, if the time exceeds the minimum inter-message time for a time-based framing convention, the intact message may be passed to a handler for time-based protocols, which may subject the data to the time integrity test.

As FIG. 5 also shows, in 507, a determination may be made as to whether the data passed the time integrity check of 506, and if the data passed the time integrity check, then in 508, the data may be handled according to the time-based protocol. In other words, the message may be checked for integrity, and if the check is successful, the message may be handled by the underlying (time-based) software.

For example, a message may be extracted from the data, and the message parsed (and interpreted). Of course, depending upon the particular message sent and extracted, one or more operations may be performed in response, e.g., signal generation/acquisition/storage, etc., with or by one or more of the I/O modules and/or devices coupled to the distributed I/O device.

If in 507, the data did not pass the time integrity check, then in 510, the data may be forwarded to a delimiter framing checker, which may be operable to determine if the data are framed by delimiters. For example, as indicated in 512, the data may be scanned for delimiters associated with any of a plurality of delimiter-based protocols. Typically, this scanning will search for specified delimiter pairs defining a complete frame (data frame) with respect to one of a plurality of delimiter-based protocols.

In 513, a determination may be made as to whether a complete frame was found in 512, i.e., if a specified delimiter pair defining a complete frame has been found in the data, and if not, the method may return to 402 to read the next data on the serial port, and may proceed as described above.

If in 513, it is determined that delimiters are included in the data, then an appropriate delimiter-based protocol for the data may be determined based on the determined delimiters, and an integrity check of the data may be performed in accordance with the determined delimiter-based protocol (i.e., a frame integrity check), as indicated in 514.

In 515, a determination may be made as to whether the data passed the frame integrity check, and if the data passed the frame integrity check, then in 508, the data may be handled according to the determined delimiter-based protocol. For example, similar to above, a message may be extracted from the data, and the message parsed (and interpreted) in accordance with the determined protocol. As also described above, depending upon the particular message sent and extracted, one or more operations may be performed in response, e.g., signal generation/acquisition/storage, etc., with or by one or more of the I/O modules and/or devices coupled to the distributed I/O device.

In other words, if the frame integrity check fails, the data may be passed to the delimiter-based handler, which may assemble the discrete messages passed down from the time-based handler, then scan them for special sequences indicating the beginning and end of a frame. If the sequences are found, the message is checked for frame integrity, and, if the check succeeds, passed to the underlying (delimiter-based) software.

Finally, as FIG. 5 indicates, if the data did not pass the frame integrity check of 515, the data may be discarded, and the method may return to 402, and may proceed as described above, repeating 402-516 in an iterative manner to read a stream of data from the serial port of the distributed I/O device.

Note that in some embodiments, the method may only support a single time-based protocol, or multiple time-based protocols if and only if their inter-message timeouts or durations are identical. Note also that the methods described herein may support an arbitrary number of delimiter-based protocols, since the delimiter-based handler may be capable of searching for multiple sets of begin/end sequences simultaneously.

In some embodiments, an assumption may be made that any protocols supported have some type of integrity check that indicates whether a message is valid or not, such as a CRC check or checksum, or any other integrity check desired.

As indicated above, in preferred embodiments, the methods described herein may be performed by one or more programs executing on the distributed I/O device 92. The one or more programs may include one or more of: a text-based program, such as C/C++, JAVA, etc., or a graphical program, where the graphical program includes a plurality of interconnected nodes that visually indicate functionality of the graphical program.

Exemplary graphical programs include those developed under the LabVIEW® graphical programming development system, provided by National Instruments Corporation. In some embodiments, the graphical program may include or be a graphical data flow program.

As mentioned above, the one or more programs implementing embodiments of the present invention preferably execute on the distributed I/O device 92. For example, at least a portion of the one or more programs may be executed on a processor included in the distributed I/O device 92. In some embodiments, at least a portion of the one or more programs may be executed on a programmable hardware element (e.g., an FPGA) included in the distributed I/O device. In further embodiments, the distributed I/O device 92 may include both a processor/memory, and a programmable hardware element, where each executes a respective portion of the one or more programs implementing embodiments of the present invention.

Benefits

Devices implementing embodiments of the techniques disclosed herein are the first devices to allow users to employ a variety of stream-based protocols on a serial port with no configuration required. In other words, the device automatically detects which protocol is being used, e.g., on a message-by-message basis, and responds appropriately. More specifically, the device detects the different framing conventions used by the different protocols. Possible benefits resulting from use of these techniques include, but are not limited to:

Improved manufacturing efficiency—the fact that a single device, i.e., a single product and part number, may support multiple serial protocols without special configuration precludes having to offer a variety of products that differ only in the protocol/framing convention that they are pre-configured to support.

No configuration—the user does not have to specify which protocol they want to use. The device is "plug and play" and recognizes any protocol that it supports out of the box.

Ease of ordering—customers and salespeople do not need to decide which product is appropriate, since the single product supports many serial protocols.

Engineering efficiency—because support and maintenance of multiple products is not required, nor support, maintenance, and documentation of a configuration interface, the device is less expensive in terms of non-recurring engineering and expense, and ongoing support.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing distributed input/output (I/O), the method comprising:

using a computer to perform:
   a) receiving data from a serial port coupled to a serial transmission medium;
   b) automatically determining if the data are framed by time, wherein said automatically determining if the data are framed by time is performed without user involvement;
   c) if the data are determined to be framed by time, handling the data according to a time-based protocol, wherein the time-based protocol is automatically selected from a plurality of time-based protocols without user input specifying the time-based protocol;
   d) if the data are determined to not be framed by time:
      automatically determining that the data are framed by delimiters wherein said automatically determining that the data are framed by delimiters is performed without user involvement;
      automatically determining an appropriate delimiter-based protocol for the data from a plurality of delimiter-based protocols, wherein the delimiter-based protocol is automatically selected from the plurality of delimiter-based protocols without user input specifying the delimiter-based protocol; and
      handling the data according to the appropriate delimiter-based protocol; and
   e) repeating a)-d) in an iterative manner to read a stream of data from the serial port.

2. The method of claim 1, wherein said receiving data comprises receiving the data at a current time of reception, and wherein said automatically determining if the data are framed by time comprises:
   determining a duration between reception of immediately previous received data and the current time of reception; and
   if the determined duration exceeds a specified value, performing an integrity check of the data in accordance with the time-based protocol.

3. The method of claim 1, wherein said handling the data according to the time-based protocol comprises:
   extracting a message from the data; and
   parsing the message.

4. The method of claim 3, wherein said handling the data according to the time-based protocol further comprises:
   performing an integrity check of the data in accordance with the time-based protocol.

5. The method of claim 1,
   wherein said automatically determining that the data are framed by delimiters comprises:
      scanning the data for delimiters associated with any of the plurality of delimiter-based protocols; and
      determining that delimiters are included in the data; and wherein said automatically determining an appropriate delimiter-based protocol for the data from a plurality of delimiter-based protocols comprises:
determining the appropriate delimiter-based protocol for the data based on the determined delimiters;
the method further comprising:
performing an integrity check of the data in accordance with the determined appropriate delimiter-based protocol.

6. The method of claim 5, wherein said handling the data according to the appropriate delimiter-based protocol comprises:
extracting a message from the delimited data; and
parsing the message.

7. The method of claim 1, wherein the serial transmission medium comprises:
a synchronous serial transmission medium; or
an asynchronous serial transmission medium.

8. The method of claim 1, wherein a)-e) are performed by one or more programs executing on a distributed I/O device.

9. The method of claim 8, wherein the one or more programs comprise one or more of:
a text-based program; or
a graphical program, wherein the graphical program comprises a plurality of interconnected nodes that visually indicate functionality of the graphical program.

10. The method of claim 9,
wherein the graphical program comprises a graphical data flow program.

11. The method of claim 8, wherein at least a portion of the one or more programs is executed on a processor comprised in the distributed I/O device.

12. The method of claim 8, wherein at least a portion of the one or more programs is executed on a programmable hardware element comprised in the distributed I/O device.

13. The method of claim 8, wherein the data are received from a controller coupled to the distributed I/O device via the serial transmission medium.

14. The method of claim 13, wherein the controller comprises one or more of:
a desktop computer system; or
a dedicated controller.

15. The method of claim 13, further comprising:
the distributed I/O device sending further data to the controller via the serial transmission medium.

16. The method of claim 8, wherein the distributed I/O device is coupled to one or more I/O modules, wherein the one or more I/O modules comprise one or more of:
a data acquisition (DAQ) device;
a motion control device; or
a signal generation device.

17. The method of claim 1, wherein the time-based protocol or the delimiter-based protocol is determined automatically without user input selecting the time-based protocol or the delimiter-based protocol.

18. A distributed data acquisition system, comprising:
distributed I/O device, comprising a serial port; and
a controller, coupled to the serial port of the distributed I/O device via a serial transmission medium;
wherein the distributed I/O device is operable to:
a) read data from the serial port;
b) automatically determine if the data are framed by time without user involvement;
c) if the data are determined to be framed by time, handle the data according to a time-based protocol, wherein the time-based protocol is automatically selected from a plurality of time-based protocols without user input specifying the time-based protocol;
d) if the data are determined to not be framed by time:
automatically determine that if the data are framed by delimiters time without user involvement;
automatically determine an appropriate delimiter-based protocol for the data from a plurality of delimiter-based protocols, wherein the delimiter-based protocol is automatically selected from the plurality of delimiter-based protocols without user input specifying the delimiter-based protocol; and
handle the data according to the appropriate delimiter-based protocol; and
e) repeat a)-d) in an iterative manner to read a stream of data from the serial port.

19. A computer accessible memory medium that stores program instructions executable by a processor to:
a) receive data from a serial port coupled to a serial transmission medium;
b) automatically determine if the data are framed by time without user involvement;
c) if the data are determined to be framed by time, handle the data according to a time-based protocol, wherein the time-based protocol is automatically selected from a plurality of time-based protocols without user input specifying the time-based protocol;
d) if the data are determined to not be framed by time:
automatically determine that the data are framed by delimiters without user involvement;
automatically determine an appropriate delimiter-based protocol for the data from a plurality of delimiter-based protocols, wherein the delimiter-based protocol is automatically selected from the plurality of delimiter-based protocols without user input specifying the delimiter-based protocol; and
handle the data according to the appropriate delimiter-based protocol; and
e) repeat a)-d) in an iterative manner to read a stream of data from the serial port.

20. A system, comprising:
means for a) receiving data from a serial port coupled to a serial transmission medium;
means for b) automatically determining if the data are framed by time without user involvement;
means for c) if the data are determined to be framed by time, handling the data according to a time-based protocol, wherein the time-based protocol is automatically selected from a plurality of time-based protocols without user input specifying the time-based protocol;
d) if the data are determined to not be framed by time:
means for automatically determining that the data are framed by delimiters without user involvement;
means for automatically determining an appropriate delimiter-based protocol for the data from a plurality of delimiter-based protocols, wherein the delimiter-based protocol is automatically selected from the plurality of delimiter-based protocols without user input specifying the delimiter-based protocol; and
means for handling the data according to the appropriate delimiter-based protocol; and
means for repeating a)-d) in an iterative manner to read a stream of data from the serial port.

* * * * *